Patented Jan. 12, 1943

2,308,418

UNITED STATES PATENT OFFICE 2,308,418

PRODUCTION OF METALLIC MAGNESIUM

Joseph D. Hanawalt and John S. Peake, Midland, Mich., assignors to The Dow Chemical Company, Midland, Mich., a corporation of Michigan No Drawing. Application July 5, 1941, Serial No. 401,299

6 Claims. (Cl. 75—67)

This invention relates to certain improvements in the prepartion of metallic magnesium.

In the preparation of magnesium by the thermal reduction of magnesia-containing ores with carbon as a reducing agent, the magnesium is liberated at an elevated temperature in the vapor state in admixture with carbon monoxide and must be recovered by condensation. However, as is konwn, the recovery of magnesium from this vapor mixture is made extremely difficult because of the fact that at ordinary condensing temperatures the magnesium and carbon monoxide tend to interact, reverting to magnesia and carbon. Numerous recovery processes have been suggested for overcoming this difficulty, but most of them are subject to the serious disadvantage that the magnesium is obtained in the form of a pyrophoric dust which can be converted to solid metal only by elaborate and costly treatment.

The principal object of the invention, then, is to provide an improved method of recovering magnesium from vapor mixtures with carbon monoxide which avoids the difficulties mentioned.

In the invention the magnesium vapors to be recovered are passed into intimate contact with a molten metal which is miscible with and has a boiling point lower than that of magnesium and is supplied at such a temperature that the magnesium dissolves therein. By dissolving, the magnesium vapor is at once removed from contact with the carbon monoxide, so that reaction with the latter is prevented. The magnesium may then be recovered from the absorbent metal by distillation or crystallization.

In practice, the process of the invention is applicable to a variety of processes for recovering magnesium from its ores. Materials consisting essentially of magnesia, such as calcined magnesite, calcined dolomite, calcined brucite, or mixtures thereof, are ordinarily used, but other substances which produce magnesia on heating, such as magnesium carbonate, and even such materials as magnesium chloride, may at times be employed. Carbon, preferably in finely divided form, as in ground coke or graphite, is mixed with the ore, customarily in a proportion equivalent or in excess of that sufficient to reduce the magnesium compound present, and the resulting mixture, usually briquetted, is heated in a furnace to a temperature at which magnesium is liberated as a vapor. Reduction temperatures well above 1000° C., commonly 1300° to 1800° or even 2000° C., are required, the exact value depending somewhat upon the pressure and other conditions. Reducing agents other than carbon, such as aluminum, silicon or ferrosilicon, calcium carbide or silicide, and silicon carbide, may also be used in the reduction, although, as explained, the invention is directed primarily to the recovery of magnesium from the vapor mixtures with carbon monoxide produced when carbon is the reducing agent.

The magnesium vapor or vapor mixture liberated in the reduction zone, which may be filtered or otherwise treated to separate it from dustlike portions of the ore charge which tend to be suspended therein, is then delivered to a condenser in which it is passed into contact with the molten metal absorbent. The absorbent should, of course, be one in which magnesium is freely soluble and should desirably have a boiling point lower than that of magnesium, such as mercury, sodium, cadmium, or zinc. The supply of molten metal absorbent is, of course, maintained at a temperature well below the vaporization temperature of magnesium at the existing pressure, so that the vapor will dissolve readily in the absorbent.

Contact between the molten absorbent and the magnesium vapor may be effected in any desired manner. For instance, the vapor may be allowed to bubble upwardly into a pool of the absorbent. In practice, however, it has been found especially convenient to pass the vapor into a shower of the absorbent in a suitable tower.

The absorbent entering the condenser may be maintained at a temperature well below its boiling point, or may itself be in part allowed to volatilize in the condenser, thus removing a portion of the heat of condensation of the magnesium. In either case, after condensation the magnesium may be separated from the absorbent solution by heating the latter to vaporize the absorbent, leaving the magnesium as residue. Alternatively, the magnesium may be recovered by fractional crystallization, a procedure which is particularly effective when mercury is the absorbent.

Other modes of applying the principle of the invention may be employed instead of those explained, change being made as regards the details described, provided the steps recited in any of the following claims or the equivalent thereof are employed.

We claim:

1. In making magnesium, the method which comprises heating a mixture comprising magnesia-containing ore and carbon in a proportion at least equivalent chemically to the magnesia to a temperature sufficient to liberate the magnesium as a vapor in admixture with carbon monoxide, passing the vapor mixture into contact with a molten metal miscible with magnesium and supplied at such a temperature that the magnesium dissolves therein, said metal being one having a boiling point lower than that of magnesium, whereby the magnesium is dissolved in the said absorbent, separating the resultant mixture from the carbon monoxide, and heating the separated mixture to volatilize the molten metal absorbent, leaving magnesium as residue.

2. In a process for recovering magnesium from vapor mixture with carbon monoxide, the steps which comprise passing the said mixture into intimate contact with a molten metal supplied at a temperature below the vaporization temperature of magnesium at the existing pressure, the said metal being one having a boiling point lower than that of magnesium, whereby the magnesium is condensed in admixture with the said metal, separating the resulting mixture from the carbon monoxide, and recovering magnesium from the mixture.

3. A process according to claim 2 wherein the molten metal condensing agent is mercury.

4. In a process for recovering magnesium from vapor mixtures with carbon monoxide, the steps which comprise passing the said mixture into intimate contact with liquid mercury, whereby the magnesium is condensed in the mercury; separating the resulting condensate from the carbon monoxide; and recovering magnesium from the separated condensate by fractional crystallization.

5. In a process for recovering magnesium from vapor mixtures with carbon monoxide, the steps which comprise passing the said mixture into intimate contact with a molten metal absorbent miscible with magnesium and having a boiling point lower than that of magnesium, the said metal being supplied at such a temperature below the vaporization temperature of magnesium at the existing pressure that the absorbent metal is in part volatilized during the condensation of magnesium therein; separating the resulting liquid magnesium-containing absorbent mixture from the carbon monoxide; and recovering magnesium from the separated mixture.

6. In a process of recovering magnesium from the vapor state, the steps which comprise passing the magnesium vapor into intimate contact with a molten metal miscible with magnesium and having a boiling point lower than that of magnesium, whereby the magnesium is condensed in admixture with the said metal, and thereafter recovering magnesium from the mixture.

JOSEPH D. HANAWALT.
JOHN S. PEAKE.